(12) United States Patent
Sehra et al.

(10) Patent No.: US 11,893,008 B1
(45) Date of Patent: Feb. 6, 2024

(54) SYSTEM AND METHOD FOR AUTOMATED DATA HARMONIZATION

(71) Applicant: Fractal Analytics Private Limited, Mumbai (IN)

(72) Inventors: Manas Sehra, Noida (IN); Raj Nigam, Gurugram (IN)

(73) Assignee: Fractal Analytics Private Limited, Maharashtra (IN)

( * ) Notice: Subject to any disclaimer, the term of this patent is extended or adjusted under 35 U.S.C. 154(b) by 0 days.

(21) Appl. No.: 18/167,715

(22) Filed: Feb. 10, 2023

(30) Foreign Application Priority Data

Jul. 14, 2022 (IN) .............................. 202221040444

(51) Int. Cl.
*G06F 16/00* (2019.01)
*G06F 16/23* (2019.01)
*G06F 16/25* (2019.01)
*G06F 16/2455* (2019.01)
*G06F 16/215* (2019.01)

(52) U.S. Cl.
CPC ........ *G06F 16/2365* (2019.01); *G06F 16/215* (2019.01); *G06F 16/24556* (2019.01); *G06F 16/254* (2019.01)

(58) Field of Classification Search
None
See application file for complete search history.

(56) References Cited

U.S. PATENT DOCUMENTS

| | | | |
|---|---|---|---|
| 9,105,000 B1 * | 8/2015 | White | G06F 16/244 |
| 2016/0078507 A1 * | 3/2016 | Shivaswamy | G06Q 30/0629 |
| | | | 705/26.2 |
| 2021/0342490 A1 * | 11/2021 | Briancon | G06F 21/14 |
| 2021/0350426 A1 * | 11/2021 | Scavo | G06F 16/258 |
| 2022/0058193 A1 * | 2/2022 | Smith | G06F 16/256 |
| 2022/0179873 A1 * | 6/2022 | Yuan | G06F 16/254 |

* cited by examiner

*Primary Examiner* — Bai D Vu
(74) *Attorney, Agent, or Firm* — Wiley Rein LLP (57) ABSTRACT

Systems and methods are provided to aggregate and analyze data from a plurality of data sources. The system may obtain data from a plurality of data sources. The system may also transform data from each of the plurality of data sources into a format that is compatible for combining the data from the plurality of data sources. The system uses a data harmonization module to organize, classify, analyze and thus relate previously unrelated data stored in multiple databases and/or associated with different organizations. The system can generate and publish master data of a plurality of business entities.

14 Claims, 5 Drawing Sheets

SYSTEM AND METHOD FOR AUTOMATED DATA HARMONIZATION

RELATED APPLICATION

This application claims priority benefit of Indian Patent Application No.

FIELD

The present disclosure relates to systems and methods for data harmonization. More specifically, the present disclosure relates to implementing data harmonization by analysis of structured data and/or unstructured data from a plurality of data sources.

BACKGROUND ART

Organizations and/or companies are producing increasingly large amounts of data. At the same time, it has become more important than ever for businesses to leverage voluminous data and transform it into actionable insights. The collection, consolidation and general centralized data processing of business data is a necessary pre-condition to the operation of modern data warehouse systems also known as Business Intelligence (BI) systems and or "Big Data" (BD) systems.

Some of the key problems in building data warehouses or BI systems in general are identifying and describing which types of data are required to be collected, identifying where the required data are located in various foreign or remote business systems, and most importantly extracting and processing the required data from multiple heterogeneous remote data sources, while performing these steps on a recurring and ideally automated basis. Therefore, there is a great need for an improved technology platform to collect and integrate voluminous data on an automated basis for subsequent business analysis.

Data types in general include structured data type and unstructured data type. Structured data generally refers to data existing in an organized form, such as a relational database, that can be accessed and analyzed by conventional techniques (i.e., Standard Query Language, SQL). By contrast, unstructured data can refer to data in a textual format (e.g., handwritten notes, word processor documents, e-mails, saved web pages, printed forms, photographic prints, or a collection of these formats) that do not necessarily share a common organization. Unstructured information often remains hidden and un-leveraged by an organization primarily because it is hard to access the right information at the right time or to integrate, analyze, or compare multiple items of information as a result of their unstructured nature.

Structuring previously unstructured data from, for example, naturally occurring human friendly text is information intensive and complex and typically loses original meaning and context. Additionally, in many instances, data (structured data and/or unstructured data) associated with an event or a task can be stored across multiple databases that are logically separate.

Hence, a need exists for a system and method for implementing data harmonization that can programmatically organize, analyze and relate structured data and/or unstructured data that are stored in multiple (separate) databases. A further need exists for a system and method for classifying, gathering, categorizing, and analyzing of structured data and/or unstructured data stored in multiple databases for tracking trends and exceptions that can be used to make determinations based on the data.

SUMMARY OF THE INVENTION

The present invention relates to systems and methods for providing a flexible and scalable data-to-decision platform to solve complex cases of high data volume, variety, and velocity. The platform enables data standardization routines in order to obtain clean and consistent data ready for analysis in any format. The present invention aims to harmonize global data from multiple sources to address differences in structures, hierarchies, sources, markets, and currencies. One advantage is that the invention can drastically shorten the data-to-action time step and significantly reduce the cost from using and re-formatting these numerous, rapidly growing, incompatible volumes of operational data and information.

Various embodiments are directed generally to data analysis and specifically to methods and systems for automated processing data from various data sources. Embodiments of the invention are designed to contain and reduce the impact of the data challenges associated with business requirements to access and utilize multiple and incompatible data sources. Embodiments can assist users in evaluation and planning to integrate disparate data sources for use within the enterprise or reposition for external business partners requirements.

According to certain aspects, the invention provides advanced software architected to leverage the big data from multiple sources for use by business groups or individuals. The present invention enables data sources to be transferred, modified, and computations performed based on the needs of the end users operating independently or within the enterprise's data assets. This makes it possible to cost effectively capture any data source and place within the enterprise's standard data structures and processes.

Certain embodiments of the present invention provide a computer system configured to aggregate and analyze data from a plurality of data sources comprises: one or more hardware computer processors configured to execute code in order to cause the system to: upload data from a plurality of data sources; pre-process and cleanse data; validate pre-processed data; transform data into a format with a standardized dimension; extract features/attributes by pattern recognition from each of the plurality of data sources; classify data by enabling supervised learning to determine a decision boundary to separate difference classes; map the data from each of the plurality of data sources to an unique product of the plurality of products; harmonize structured and/or unstructured data from a plurality of data sources; review data by a subject matter expert; and publish data.

Furthermore, certain embodiments of the present invention provide a computer system that comprises an application server, a data processing cluster, a metadata store and a message broker.

In some embodiments, the system comprises a metadata store configured to store information about data stored in any input database and output database for business intelligence or reporting. In one embodiment, the metadata store may store data type or attribute definitions that are used to access data within one or more of the input databases. The data type may comprise product brand/sub-brand, stock keeping units (SKUs), selective key performance indicators (KPIs), or the like. In one embodiment, the metadata store includes a fully integrated relational PostgreSQL database, a powerful, open-source object-relational database management system.

In some embodiments, the system comprises a message broker configured to receive inbound queues and generate outbound queues. The message broker may deploy an industry standard message queuing protocol. Common examples include RabbitMQ, Amazon Simple Queue Service, IBM Web sphere MQ AMQP and others. The message broker may receive messages from an end user or one or more of the data sources. The messages may include data (such as sensor data, time-series data, relational data, or any other type of data that may be provided by the data sources) and metadata to identify the type of message. Based on the message type, the communication logic may place a message into an inbound queue, wherein the message will await processing. When data or messages need to be sent to one or more of the data sources, messages may be placed in the outbound queues. When available, the communication logic may provide a message to the message sender for communication to a destination data source.

In some embodiments, the system comprises a mapping module that uses advanced machine learning techniques to extract and synchronize any kind of data. The mapping module is configured to prepare, validate and transform data to get standardized dimensions across data sources and create master data for further processing, with a possible subject matter expert (SME) approval. A feedback loop ensures that the platform learns and improves with every new user interaction.

In certain embodiments, the present system uses reproducible and robust metadata-based data mapping processes that are executed on an elastic, scalable platform. During the data mapping process, the source data is directed to the targeted database—the output database. The output database can be a relational database or a CSV document—depending on the use case. The metadata is used to explain the data fields and attributes that constitute the data and semantic rules. A metadata-based data mapping template is used to match fields from one database system to the other.

In certain embodiments, the mapping module is enabled through the power of machine learning. The machine learning component is configured to provide a plurality of prediction and machine learning processing algorithms including basic statistics, dimensionality reduction, classification and regression, optimization, collaborative filtering, clustering, feature selection, and/or the like. The machine learning component closely integrates with industry-standard interactive data exploration environments such as IPython®, RStudio®, and other similar platforms. This allows users to explore and understand their data directly inside the platform, without the need to export data from a separate system or operate only on a small subset of the available data. The machine learning component also contains a suite of state-of-the-art machine learning libraries, including public libraries such as those built upon the Apache Spark™, R®, and Python® systems to enable close integration of machine learning algorithms.

The mapping module is configured to extract features/attributes from statements by pattern recognition, which are then given a weight and are assigned probabilities to aid the extraction process; determine a decision boundary by enabling supervised learning to separate different classes, wherein the decision boundary is formed by maximizing the distance between the margins and finding the linear or non-linear hyperplane (kernels trick) or on the basis of conditional probabilities; identify rows with minimum distance by enabling supervised learning to find distance on the basis of different matrix, wherein the algorithms standardize text on the basis of cleansing, distance matrix, and domain understanding; improve accuracy through a user feedback loop by learning from previous prediction and reducing errors in subsequent interactions.

In some embodiments, the system comprises a data harmonization module that can organize, classify, analyze and thus relate previously unrelated data stored in multiple databases and/or associated with different organizations. In such embodiments, the data harmonization module can relate such previously unrelated data sets to, for example, track trends, exceptions, inconsistencies, location, etc. such that determinations can be made based on such different and/or previously unrelated data sets. In such embodiments, the data harmonization module can be used to harmonize both structured data and/or unstructured data based on business rule-based analysis. In some embodiments, the data harmonization module is configured to harmonize structured data and/or unstructured data at various levels of granularity, thereby providing the ability to seamlessly blend data as dictated by, for example, a business rule. In some embodiments, the data harmonization module is configured to transform the received data into a plurality of unified, harmonized master data sets, including but not limited to, dimension master, location master, attribute master, business rule master, product master and currency master.

One embodiment may include an automated data integration platform implemented on one or more hardware computer processors and one or more storage devices, the platform comprising:

an input database, wherein the input database is configured to upload data from a plurality of data sources, wherein the plurality of data sources comprise a plurality of data types or data formats;

a data integration platform, wherein the data integration system comprises a web application server, a data processing cluster, a metadata store and a message broker; and an output database;

wherein the data integration system is configured to execute code in order to cause the system to:

receive inbound message by the message broker;

transmit data from the input database;

pre-process data, wherein the pre-processing step comprises one or more of removing empty records, removing duplicate records, and filling missing records based on an average of historical data;

extract attributes from the pre-processed data by enabling a pattern recognition algorithm following a metadata-based mapping logic over the plurality of data types, wherein a metadata store is configured to store data type or attribute definitions that are used to access data within one or more of the input databases;

transform the plurality of data formats to a standardized data format that is pre-selected by a user;

enrich the pre-processed data by enabling supervised learning to determine a decision boundary to separate different classes of the data;

align the pre-processed data by enabling supervised learning to unify or de-duplicate records that have similar naming convention for a given attribute and standardized text;

enhance accuracy through a user feedback loop by learning from previous prediction and reducing errors in subsequent interactions;

harmonize structured and unstructured data stored in multiple databases and/or associated with different organizations;

generate master data of a plurality of business entities;

and publish the transformed data to the output database.

Another embodiment may include a method for automated data integration, comprising:

uploading data to an input database from a plurality of data sources, wherein the plurality of data sources comprises a plurality of data types or data formats;

transmitting data from the input database to a data integration system;

pre-processing data, wherein the pre-processing step comprises one or more of removing empty records, removing duplicate records, and filling missing records based on an average of historical data;

transforming the plurality of data formats to a standardized data format that is selected by a user;

extracting features from the pre-processed data by enabling a pattern recognition algorithm following a metadata-based mapping framework over the plurality of data types, wherein a metadata store is configured to store data type or feature definitions that are used to access data within one or more of the input databases;

enriching the pre-processed data by enabling supervised learning to determine a decision boundary to separate different classes of the data;

aligning the pre-processed data by enabling supervised learning to unify or de-duplicate records that have similar naming convention for a given feature and standardize text;

enhancing accuracy through a user feedback loop by learning from previous prediction and reducing errors in subsequent interactions;

harmonizing structured and unstructured data stored in multiple databases and/or associated with different organizations;

generating master data of a plurality of business entities; and publishing the master data to the output database.

BRIEF DESCRIPTION OF THE DRAWINGS

The invention will be described in more detail below on the basis of one or more drawings, which illustrates exemplary embodiments.

DETAILED DESCRIPTION OF THE EMBODIMENTS

It should be understood that this invention is not limited to the particular methodology, protocols, and systems, etc., described herein and as such may vary. The terminology used herein is for the purpose of describing particular embodiments only and is not intended to limit the scope of the present invention, which is defined solely by the claims.

As used in the specification and appended claims, unless specified to the contrary, the following terms have the meaning indicated below.

"Time Series Analysis" refers to methods for analyzing time series data to extract meaningful statistics and other characteristics of the data.

"Unstructured data" may refer to documents whose content includes written human language. This may include, but is not limited to, business documents such as word processing documents, spreadsheets etc. or transcripts of audio conversations or survey comments or social media posts (e.g., Twitter posts or Facebook posts).

"Deep learning" refers to a subfield of machine learning concerned with algorithms inspired by the structure and function of the brain called artificial neural networks.

"Natural language generation (NLG)" refers to the use of artificial intelligence (AI) programming to produce written or spoken narrative from a dataset.

"Unsupervised machine learning (ML)" refers to unsupervised machine learning algorithms that gather patterns from a dataset without reference to known, or labelled outcomes.

"Schema" refers to the organization of data as a blueprint of how the database is constructed (divided into database tables in the case of relational databases). The formal definition of a database schema is a set of formulas (sentences) called integrity constraints imposed on a database.

"Latent Dirichlet Allocation (LDA)" refers to a generative statistical model that allows sets of observations to be explained by unobserved groups that explain why some parts of the data are similar.

"Lemmatization" in computational linguistics is the algorithmic process of determining the lemma of a word based on its intended meaning.

"Part-of-speech tagging (PoS tagging)" is the process of marking up a word in a corpus to a corresponding part of speech, based on both its definition and its context—i.e., its relationship with adjacent and related words in a phrase, sentence, or paragraph.

"Regular expression" is a pattern describing amount of text.

"RabbitMQ" is an open-source message-broker software (sometimes called message-oriented middleware) that originally implemented the Advanced Message Queuing Protocol (AMQP) and has since been extended with a plug-in architecture to support Streaming Text Oriented Messaging Protocol (STOMP), MQ Telemetry Transport (MQTT), and other protocols.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments.

Figure 1:
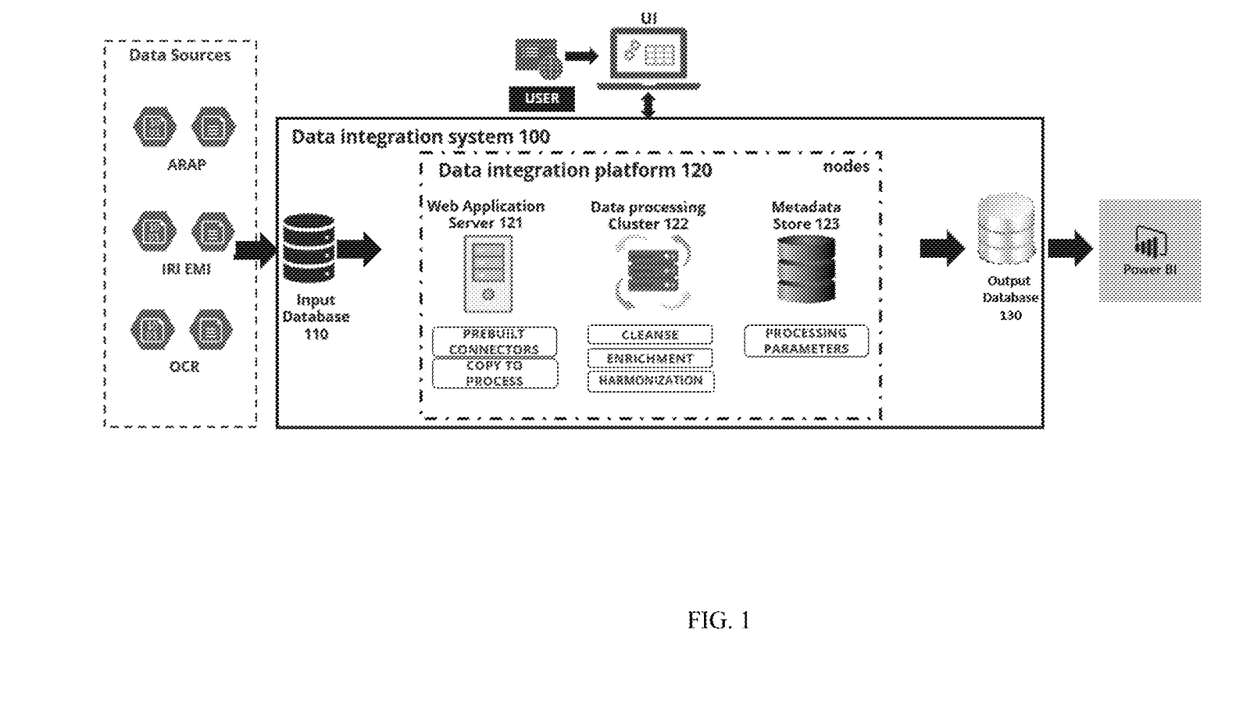
FIG. 1 is a diagram illustrating one embodiment of a data integration system configured to aggregate and integrate data from a plurality of data sources.

FIG. 1 depicts an exemplary data integration platform configured to aggregate and integrate data from a plurality of data sources. The data integration platform 100 may include an input database 110, a data integration system 120 and an output database 130. The data integration system 120 comprises a web application server 121, a data processing cluster 122 and a metadata store 123. The input database 110 connects to one or more external data sources, including online and offline data sources, through one or more networks, including but not limited to, local-area networks (LANs), wide-area networks (WANs), world wide web (WWW), or any combination thereof. The output database 130 is configured to store integrated data for business intelligence analysis or other business needs.

Figure 2:
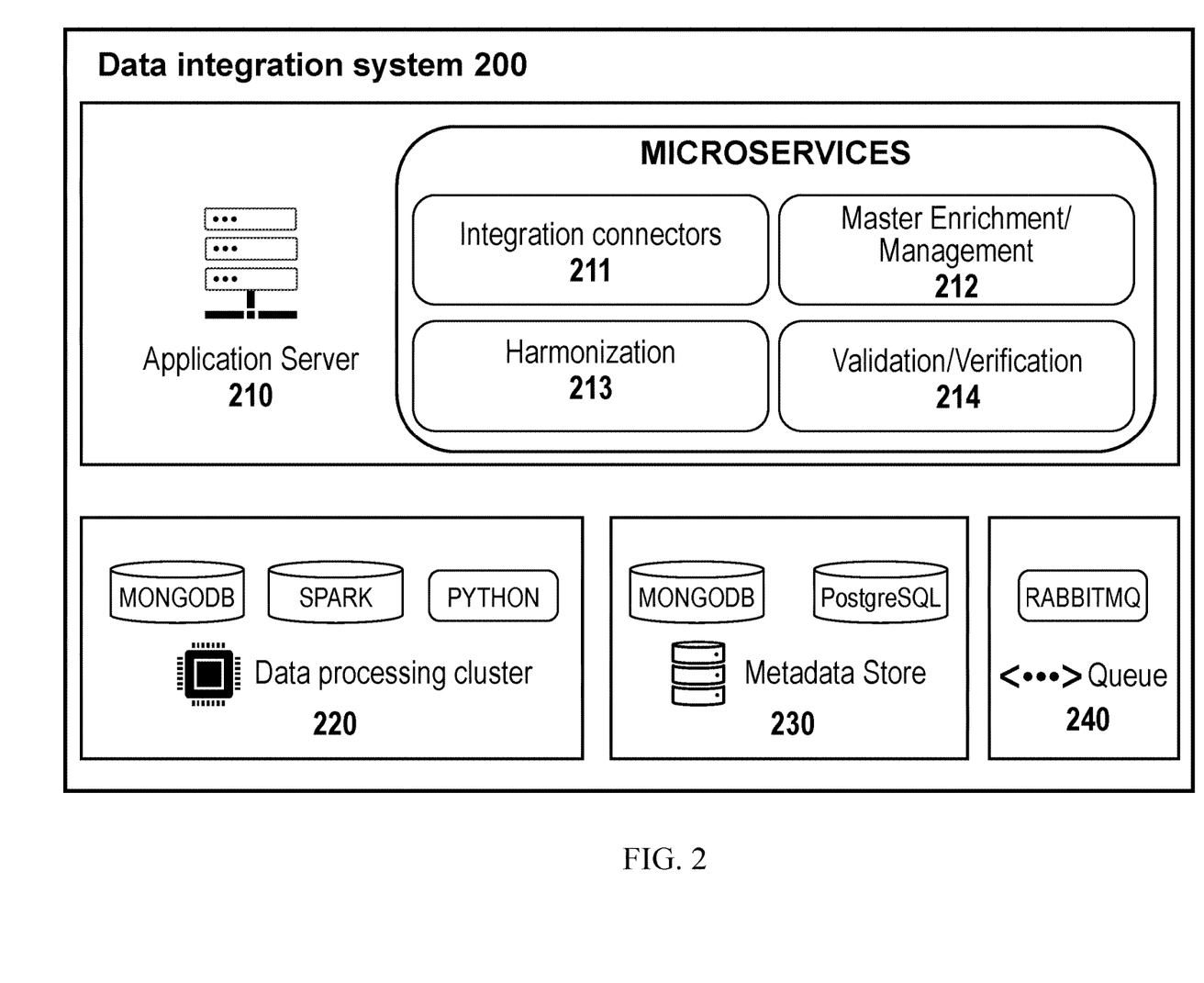
FIG. 2 is a block diagram illustrating components of the data integration system of FIG. 1, according to one embodiment.

FIG. 2 illustrates components of the data integration platform of FIG. 1, according to one embodiment. The data integration platform 200 comprises an application server 210, a data processing cluster 220, a metadata store 230 and a message broker 240.

In one embodiment, the application server 210 implements a microservices-based architecture and secure access to cloud-based applications. Embodiments support secure access for hybrid cloud deployments (i.e., cloud deployments which include a combination of a public cloud and a private cloud). Embodiments protect applications and data both in the cloud and on-premise. Embodiments support multi-channel access via web, mobile, and application programming interfaces ("APIs"). Embodiments manage access for different users. Embodiments manage, control, and audit access across the cloud as well as on-premise. Embodiments integrate with new and existing applications and identities. Embodiments are horizontally scalable.

In another embodiment, the application server 210 implements a multi-tenant, microservices architecture for designing, building, and delivering cloud-scale software services. Multi-tenancy refers to having one physical implementation of a service securely supporting multiple users buying that service. A service is a software functionality or a set of software functionalities (such as the retrieval of specified information or the execution of a set of operations) that can be reused by different users for different purposes, together with the policies that control its usage (e.g., based on the identity of the client requesting the service).

In one embodiment, a microservice is an independently deployable service. In one embodiment, the term microservice contemplates a software architecture design pattern in which complex applications are composed of small, independent processes communicating with each other using language-agnostic APIs. In one embodiment, microservices are small, highly decoupled services and each may focus on doing a small task. In one embodiment, the microservice architectural style is an approach to developing a single application as a suite of small services, each running in its own process and communicating with lightweight mechanisms (e.g., an HTTP resource API). In one embodiment, each of the microservices may be updated without adversely affecting the other microservices. In one embodiment, the startup time for each of a collection of microservices is much less than the startup time for a single application that collectively performs all the services of those microservices.

In some embodiments, a microservices-based application server 210 comprises an integration connector 211, a master enrichment management component 212, a harmonization module 213 and a validation component 214. An integration connector 211 is a module that has physical awareness about how to talk to a system. For example, an Oracle Identity Manager ("OIM") Connector is an application configured to manage user identities (e.g., manage user accounts in different systems based on what a user should and should not have access to). A master enrichment management component 212 is configured to ensure data quality by cleansing and discarding redundant and obsolete data. The validation component 214 may apply ontologies-based multi-agent systems validation method to provide a validation of microservices communication.

In some embodiments, the harmonization module 213 is configured to organize, classify, analyze and thus relate previously unrelated data stored in multiple databases and/or associated with different organizations. In such embodiments, the data harmonization module can relate such previously unrelated data sets to, for example, track trends, exceptions, inconsistencies, location, etc. such that determinations can be made based on such different and/or previously unrelated data sets. In such embodiments, the data harmonization module can be used to harmonize both structured data and/or unstructured data based on business rule-based analysis.

The structured data sources can include data present in organized columns, tables, spreadsheets, or other data structures, such as relational databases (e.g., Oracle, IBM DB2, Microsoft SQL Server, MySQL and/or PostgreSQL relational databases, etc.), one or more comma-separated values (CSV) files, one or more other pattern-delimited files, or other structured data format hierarchy. The unstructured data sources can be, for example, one or more of: a handwritten document, a typed document, an electronic word-processor document, a printed or electronic spreadsheet document, a printed form or chart, or other electronic document that contains text such as an e-mail, Adobe PDF document, Microsoft Office document, and/or the like. In some instances, the structured data sources can include, for example, one or more unstructured data elements, such as a string of text stored in as a relational database column of type string or variable character field (varchar). The structured data sources and the unstructured data sources can include data pertaining to an organization (or an entity) such as, for example, a government agency, a regulatory agency, a private enterprise, a third-party auditing agency, a private individual, a monetary transaction, a contractual agreement, an insurance claim, and/or the like.

Upon receipt of the set of structured data and/or unstructured data, the harmonization module 213 can be configured to generate a set of business rules and/or business logics. In some embodiments, the harmonization module 213 can provide functionality that allows a user to add a business rule and/or delete a business rule from a set of business rules and/or business logics. Additionally, in some instances, the harmonization module 213 can also provide functionality that can allow a user to edit and/or modify an existing business rule or relationship between one or more business rules.

In some embodiments, the harmonization module 213 can generate a business logic based on the received data and/or business rules generated. A business logic can be comprised of a business rule or a set of business rules. For example, in some instances, a business logic can involve applying three business rules to analyze structured data and/or unstructured data stored in three databases that are associated with a consumer-packaged goods company, a wholesale store and a retail store, respectively, to reveal the analysis for a specific product in a specific geographic area. The harmonization module 213 can generate and/or define three business rules to locate any file and/or report across the three databases that includes the product brand name in the filename or the report ID. The harmonization module 213 can analyze all the data stored the three databases and retrieve the results of the analysis in a table. In another instance, a business logic can involve applying three business rules to analyze structured data and/or unstructured data stored in three databases that are located US, Japan and China respectively. The prices of one specific product are in different currency in the three databases. The harmonization module 213 can generate and/or define three business rules to locate any file and/or report across the three databases that includes the product price in different currency unit in the filename or the report ID and convert the product prices to one single currency unit.

Referring to FIG. 2, in some embodiments, the data processing cluster 220 is a set of programming models to access large-scale data to extract useful information for supporting and providing business decisions. In some embodiments, parallel programming models are utilized to improve performance of databases.

Referring to FIG. 2, in one embodiment, the metadata store 230 includes a fully integrated relational PostgreSQL database, a powerful, open-source object-relational database management system. PostgreSQL boasts sophisticated features such as Multi-Version Concurrency Control (MVCC), point in time recovery, tablespaces, asynchronous replication, nested transactions (save points), online/hot backups, a sophisticated query planner/optimizer, and write ahead logging for fault tolerance. PostgreSQL supports international character sets, multi-byte character encodings, Unicode, and it is locale-aware for sorting, case-sensitivity, and formatting. PostgreSQL is highly scalable both in the sheer quantity of data it can manage and in the number of concurrent users it can accommodate. PostgreSQL also supports storage of binary large objects, including pictures, sounds, or video. PostgreSQL includes native programming interfaces for C/C++, Java, .Net, Perl, Python, Ruby, tool command language (Tcl), and open database connectivity (ODBC).

In certain embodiments, the system works by uploading data available in client enterprise systems (e.g., Purchase Order (PO), Accounts Payable (AP), Vendor Master, Item Master, and/or other information), and then applying a combination of machine learning, mathematical, and domain driven heuristic context models to them to provide classification outputs, e.g., at a line or individual record level. The auto-classification system is self-learning in nature, e.g., so that it gets better in terms of producing accurate classifications with progressive use, potentially within familiar industry verticals and/or within completely new ones.

In some embodiments, the system integrates the big data into a data warehouse by using metadata and master data as the integration links. This step is initiated once the data is tagged and additional processing such as contextualization is completed. The next step of processing is to link the data to the enterprise data set to convert and integrate the unstructured and raw data into a structured format.

Figure 3:
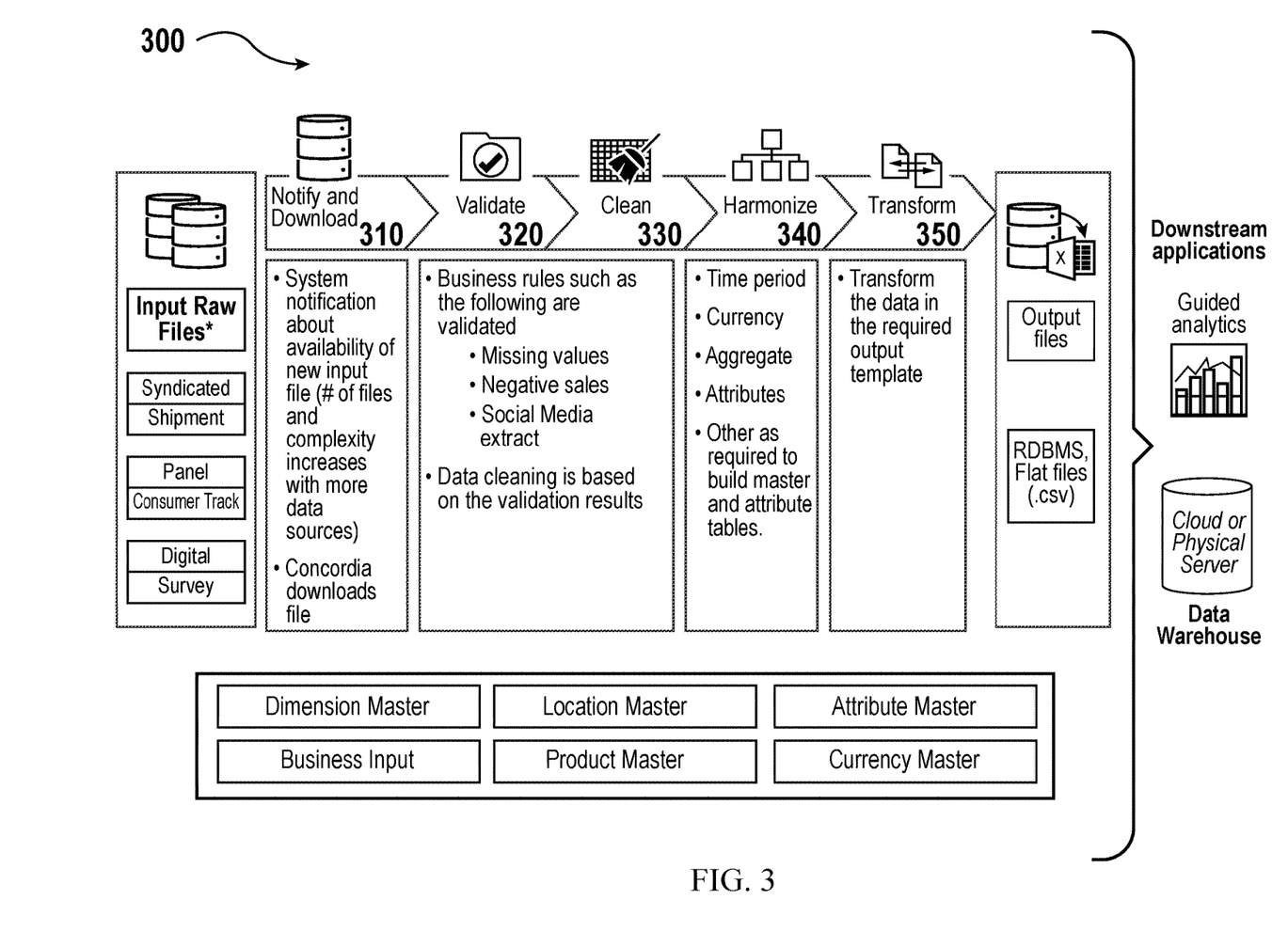
FIG. 3 is a diagram illustrating one embodiment of a technical architecture for implementation of the data integration system of FIG. 1

FIG. 3 shows an embodiment of a technical architecture for implementation of the data integration system of FIG. 1 starting from the data source to the data report level. Information coming from different data providers or sources are collected and integrated to provide a harmonized data set that is universally accessible to a variety of analytical tools. This provides greater efficiency in that a single master data repository can be used rather than requiring the duplication of data for separate databases supporting the different analysis modules. Different levels of integration can be performed: alignment, harmonization and fusion.

The data flowing into the data integration system 300 are from several raw data source including but not limited to, shipment data, which is company data source containing internal shipment data; panel data, which is external data source containing consumers and shoppers panel data; consumer track data, which is an external data source containing consumption data; digital data, which is an external data source containing consumption scanning data coming from retailers systems; and survey data, which is external data source containing survey conducted by survey service companies. The data from all sources include data relating to customers, products, timing, invoices and external data from market data suppliers.

The data integration system 300 includes a notify and download module 310, a validation module 320 and cleansing module 330, a harmonization module 340 and a transformation module 350.

The notify and download module 310 for system notification about availability of new input file including but not limited to the number of new input files and identification of source of the data files. The notify and download module 301 is also configured to download new files upon receipt of instructions from a user.

The validation module 320 and cleansing module 330 are configured to align and normalize comparable values from different data providers. Business rules for missing values, negative sales, social medial extract are validated. Data cleaning is based on the validation results.

The harmonization module 340 is configured to aggregate and transform the received data into a relational database comprising a plurality of master tables of data. These tables provide a systematic way of accessing, managing, and updating data. The relational database contains multiple tables of data that relate to each other through special key fields. Relational databases are far more flexible than what are known as flat file databases, which contain a single table of data. The master tables of the present invention are organized by subject area, including but not limited to, dimension master, location master, attribute master, business input, geography master, product master, time master, fact master and currency master. In some embodiments, geography master contains indication of the region/channel where the product is being sold or shipped. Product master contains the attributes associated in defining a business rules/logic for product being sold/traded among different entity. For example, "Pampers Premium Care Pants, Extra Large size baby diapers (XL), 24 Count, Softest ever Pampers pants" would have P&G as manufacturer, Pampers as brand and Extra Large as size. Time master contains documents consisting of standardized versions of all the time periods in the dataset. Fact master contains standardization of all the fact name in case working in global solution. The system may populate unified master tables upon receipt of new raw input data.

The transformation module 350 is configured to transform the data into the required output format to make it universally accessible. This module allows for the integration of disparate data into a unified harmonized data structure universally accessible to the downstream analytical modules.

In some embodiments, the system 300 implement an artificial intelligence (AI) data harmonization model that may detect data patterns from various data sources and automatically classify data into groups based on pre-identified or learned attributes. The AI-based data harmonization model is implemented by a computing processor.

In some embodiments, the AI-based data harmonization model may perform an AI-based data profiling to detect data patterns and automatically generate potential rules that can be used to check data quality. The harmonization model may also perform automated data mapping to map fields of a data source to fields of a target dataset. The harmonization model may also perform automated data cleansing to correct data quality errors which may be detected according to the auto-generated rules. Data cleansing may include changing data loaded from a data source and/or populating empty fields or changing null values.

A user may send a query to the system. The query may indicate a data quality requirement relevant for data management operations. The system may obtain target data from a plurality of data sources associated with the data quality requirement. The system may implement the AI-based harmonization model to sort the target data into a data cascade. The data cascade may include a plurality of attributes identified by the artificial intelligence component for the target data. Each of the attributes from the plurality of attributes may be associated with a data harmonizing requirement. In an example embodiment, data harmonization may refer to ensuring that the data is usable across different systems. The system may implement the harmonization model to evaluate the data cascade to identify a data pattern for each of the attributes from the plurality of attributes. The data pattern may be a pattern detected by the system from the data assimilated from a plurality of data sources and collated into the data cascade through combining various parameters from the identified parameter set. In some embodiments, the system may use various algorithms and technical modules as part of the artificial intelligence component for determining the data pattern. The system may obtain data from various data sources and apply techniques such as machine learning and artificial intelligence for synchronizing data from different sources as per a common pattern. The system may generate various rules for a particular data set for performing the synchronization. The synchronized data may be mapped according to similar attributes using artificial intelligence and machine learning operations.

The system may cleanse the data using intelligent data cleansing operations by generating various data cleansing rules for more effective data harmonization. The system may generate a data cleansing result corresponding to the data quality requirement. The data cleansing result may include the data harmonization model relevant for a resolution to the query. In an example, the data harmonization model may further include a harmonized dataset comprising at least a part of the target data from the plurality of sources collated through the implementation of the artificial intelligence component. The data harmonization model may further include a data harmonization index indicative of a level of harmonization achieved in the target data through the implementation of the artificial intelligence component.

Figure 4:
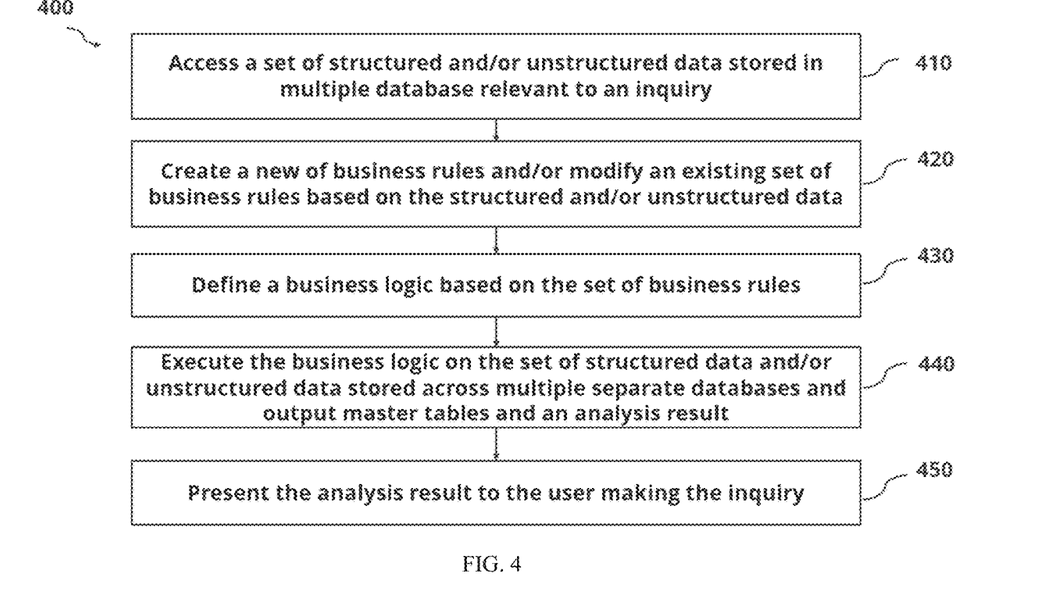
FIG. 4 is a flowchart illustrating one embodiment of a process for harmonization structured and/or unstructured data from a plurality of data sources.

FIG. 4 is a flowchart that illustrates a method 400 for relating previously unrelated data using a data harmonization module, according to an embodiment. Depending on the embodiment, the method 400 may include fewer or additional blocks, and the blocks may be performed in an order that is different than illustrated.

At block 410, a first set of previously unrelated structured data and/or unstructured data stored across multiple (separate) databases that are relevant to an inquiry is accessed. The set of structured data and/or unstructured data can be stored across multiple databases that are located, for example, either in separate non-transitory computer-readable media or on the same non-transitory computer-readable medium (on a computer system such as a personal computer or network server).

At block 420, a new set of business rules is created and/or an existing set of business rules is edited or modified (e.g., added to and/or deleted from) based on the structured data and/or the unstructured data stored in multiple databases.

At block 430, a business logic is defined based on the set of business rules. As described above, a business logic can comprise a business rule or a set of business rules. For example, in some instances, a business logic can include applying multiple rules to analyze structured data and/or unstructured data stored in multiple databases associated with an inquiry. The business logic can be generated or defined by, for example, a compute device that implements a data harmonization module. Alternatively, in some instances, the business logic can be defined by a user via a graphical user interface that allows for visual manipulation of the relationships between one or more business rules and user entry of one or more logical rules.

At block 440, the business logic is executed on the set of structured data and unstructured data that are stored in multiple databases to relate previously unrelated data and, for example, make a determination about the data set related to the inquiry. The execution can be performed, for example, by substituting each feature identifier in the business logic with a "true" or "false" signal (such as a 1 or 0), indicating the presence or absence of that feature in the set of structured data and/or unstructured data stored in multiple databases.

At block 450, the analysis is presented to the user making the inquiry. In some instances, the analysis result can be presented to the user, for example, as an output to a display device associated with the compute device that implements the data harmonization module. The analysis result can be a statistic about a certain feature of the set of structured data and/or unstructured data that are stored in multiple (separate) databases. In some instances, the analysis can be a table output of the all the associate data.

Figure 5:
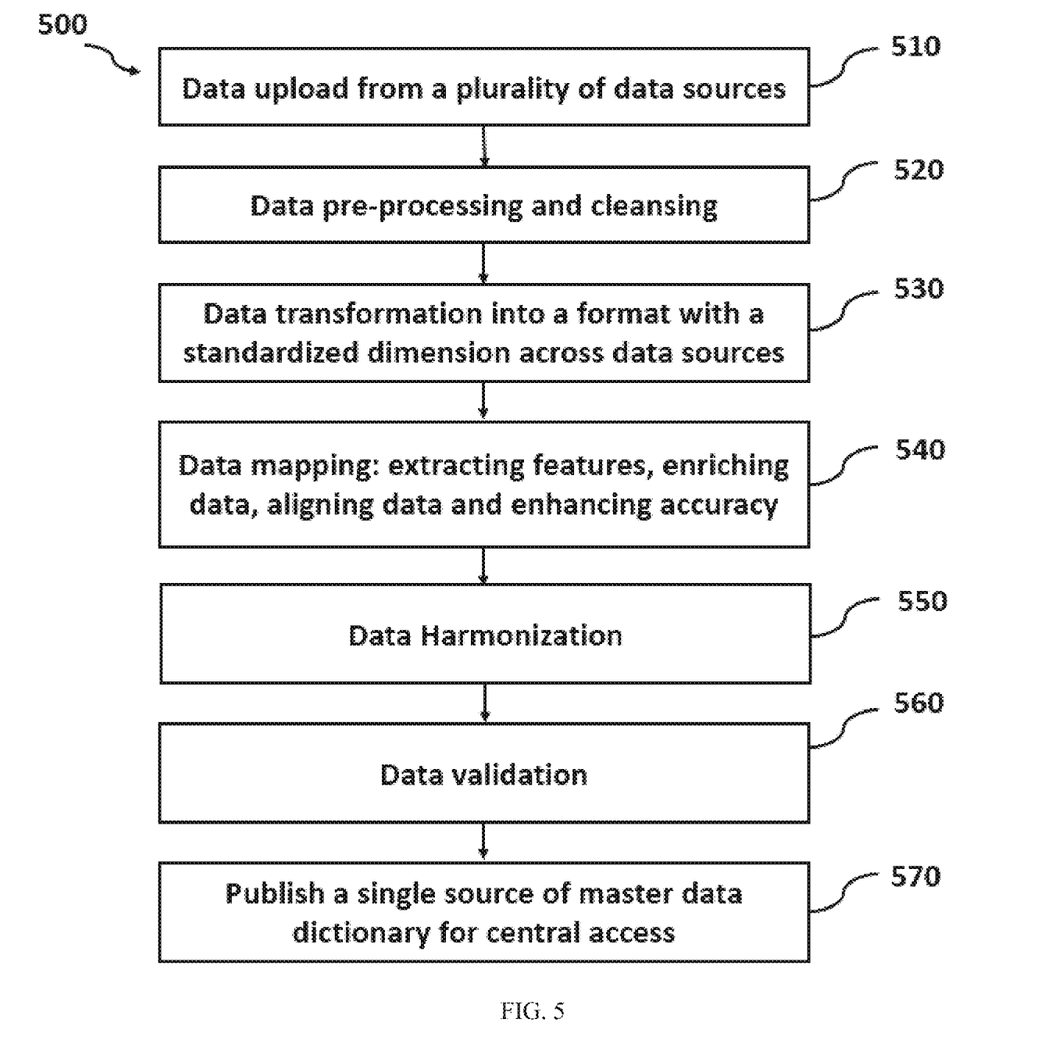
FIG. 5 is a flowchart illustrating one embodiment of a process for aggregating and integrating data from a plurality of data sources.

FIG. 5 illustrate a flow chart illustrating one embodiment of a process 400 for automated data integration implemented. The process 500 may be implemented by one or more systems described with respect of FIGS. 1-3. For illustrative purposes, the process 500 is explained below in connection with the platform 100 in FIG. 1. Depending on the embodiment, the process 500 may include fewer or additional blocks, and the blocks may be performed in an order that is different than illustrated.

At block 510, the data integration platform 100 upload data from a plurality of data sources including real-time systems, near-real-time systems, and batch-oriented applications. The type of data source accepted by the platform 100 can include a database, a web service, a flat file, a log file, or any other format data source. The data in one data source can have a different format from the data in another data source. The data is collected and loaded to an input database 110 like Hadoop or NoSQL. The data integration platform 100 may access information associated with a format of data from a data source. The information may specify the structure of data (e.g., number of columns, type of data for each column, etc.), expected size of the data, expected number of entries in the data, etc. For example, each data source (or set of data sources) may have a different format.

At block 520, the data integration platform 100 perform data pre-processing and cleansing. The data pre-processing and cleansing step comprises one or more of removing empty records, removing duplicate records, removing erroneous records, and filling missing records based on an average of historical data.

In data pre-processing step, natural language processing (NLP) is applied to process unstructured data for noise removal and text normalization. Data components that are redundant to the core text analytics can be considered as noise and may be removed. Text normalization may include a set of tasks comprising tokenization, lemmatization, and sentence segmentation. The task of tokenization is to break up a sequence of strings into pieces such as words, keywords, phrases, symbols and other elements called tokens. In the process of tokenization, some characters like punctuation marks are discarded. For processing tweets or texts, emoticons like:) or hashtags like #nlproc are tokenized. Another part of text normalization is lemmatization, the task of determining that two words have the same root, despite their surface differences. Lemmatization is essential for processing morphologically complex languages like Arabic. Text normalization also includes sentence segmentation: breaking up a text into individual sentences, using cues like periods or exclamation points.

In case of integrating multiple data sources, it may happen that one or more sources contain records denoting the same real-world object. The records may have various degrees of data quality. In one embodiment, the platform 100 may perform duplicate matching to identify duplicates and join them into a single record whose data quality would be high. Duplicate matching is also used to discover duplicates on the higher level, e.g., records of products that share the same product attributes.

Each data source may have a different set of expected characteristics. In one embodiment, the platform 100 detects inconsistencies in formatting of data from each of the plurality of data sources. In one embodiment, the platform 100 may perform multiple reliability tests on data from each of the plurality of data sources in order to identify any errors or inconsistencies in data received from the data sources. For example, the platform 100 can check whether the file size matches expected file size, structure of the data matches expected structure, and/or number of entries matches expected number of entries, among other data quality checks. Any significant deviations may signal problems with a particular data source.

In certain embodiments, the platform 100 also performs tagging to provide suitable input for the stage of feature extraction that follows. The tokenized text may be passed to a part-of speech (PoS) tagger and a parser. The PoS tagger is a software tool that labels words as one of several categories to identify the word's function in a given language. Some current major algorithms for PoS tagging include the Viterbi algorithm, Brill tagger, Constraint Grammar, and the Baum-Welch algorithm (also known as the forward-backward algorithm). Hidden Markov model and visible Markov model taggers can both be implemented using the Viterbi algorithm. Many machine learning methods, such as SVM, maximum entropy classifier, perceptron, and nearest neighbor, have also been applied to the problem of PoS tagging. Since there is a tendency for keywords to constitute noun or adjective phrases, a parser may be used to find noun or adjective phrases in the text. In at least one embodiment, the platform 100 produces two sets of the preprocessed data, one contains all different kinds of phases and the other one contains only noun and adjective phases.

At block 530, the data transformation step may transform all the values used in different data systems into one correct set of values used in the target system. When the data from different data sources are imported into the platform 100, the data from the data sources may not be in a format that can be combined. The platform 100 transforms the data into a format that is compatible for combining and/or analysis. If any incorrect values appear, the role of the data transformation is to identify those values and alter them. The transformation step may use various methods ranging from statistical data cleaning to machine learning.

In some instance, the scale of different features values may not be compatibly aligned. In some embodiments, the platform 100 may apply feature re-scaling to make sure features are on almost the same scale so that each feature is equally important and make it easier to process by most machine learning algorithms. The platform 100 may use common standardization techniques, for example, Z-score normalization, to rescale features value to ensure the mean and the standard deviation to be 0 and 1, respectively. The feature re-scaling may be used for the optimization algorithms, such as gradient descent, that are used within machine learning algorithms that weight inputs (e.g., regression and neural networks). Rescaling is also used for algorithms that use distance measurements, for example, K-Nearest-Neighbours (KNN). Another common approach is the so-called Max-Min Normalization (Min-Max scaling). This technique is to re-scales features with a distribution value between 0 and 1. For every feature, the minimum value of that feature gets transformed into 0, and the maximum value gets transformed into 1.

At block 540, as source systems may utilize different data models, the task of data mapping is to provide a metadata-based mapping from those data models to the target data model. This may require extracting features, enriching data, aligning data and enhancing accuracy.

The feature extraction step may deploy pattern recognition algorithms in which features are extracted from statements. The algorithms extract attributes based on position and label of the current word, label of previous words and other customized features. The features are given a weight and are assigned probabilities which aide the extraction process.

Feature extraction generates one or more keywords in accordance with one embodiment of the present invention. In order to identify which candidate phrases are keywords, an exemplary embodiment employs a classifier that uses the input (preprocessed data) to estimate the probability that the phrase is a keyword and assign a score to the phrase. The classifier function that maps the feature input to a keyword score may be obtained using unsupervised or supervised machine learning algorithms. Both types of algorithms use the concept of a "feature." Features are individual measurable heuristic properties of the phenomena being observed that can be used to create a numerical representation of the phenomena, which are in this case word patterns. Features are individual measurable heuristic properties of the phenomena being observed that can be used to create a numerical representation of the phenomena, which are in this case word patterns.

In one embodiment of the present invention, a supervised learning approach uses a set of features (an n-dimensional "feature vector") that are chosen for their effectiveness in separating desired and undesired entries, and examples of documents together with collections of keywords that have been generated by humans (manually constructed) are provided as training data to a machine learning algorithm. In another embodiment, an unsupervised method can use similar features selected for their sensitivity to parameters of relevance in ranking keywords, but in the absence of training data, it might use numeric values derived from the feature vectors to perform scoring and ranking of candidate entries. Subsequently, a number of candidate entries to be retained in a keyword collection can be selected using predetermined criteria for quality or for a desired number of entries. Thus, the present invention provides both unsupervised and supervised embodiments of an automatic feature extraction method.

Examples of algorithms and corresponding classifiers used in supervised and unsupervised methods include, but not limited to, LDA2Vec, neural attention method, topic modelling, joint sentiment topic model, and Word2Vec.

In one embodiment of the present invention, TF-IDF (term frequency-inverse document frequency) is used to measure the informativeness of a keyword. TF-IDF is a traditional information retrieval metric, employed in most existing keyword extraction applications. The TF-IDF weight is a weight often used in information retrieval and text mining. This weight is a statistical measure used to evaluate how important a word is to a document in a collection or corpus. The importance increases proportionally to the number of times a word appears in the document but is offset by the frequency of the word in the corpus.

Enrichment step may use supervised learning approach to independently find a decision boundary to separate different classes. The decision boundary is formed by maximizing the distance between the margins by finding the linear or non-linear hyperplane (kernels trick) or on the basis of conditional probabilities.

Alignment step may use supervised approach to find distance on the basis of different matrix (Euclidian, Manhattan) which finds out rows with minimum distance basis the initial test data provided. Suite of algorithms which unify/de-duplicate entities that have similar naming convention for a given attribute. The algorithms standardize the text on the basis of cleansing, distance matrix and domain understanding Enhancement step allows models to take suitable action to learn from previous prediction and reduce error in subsequent iterations. The user input is used as a feedback loop to ensure the accuracy improves with every iteration.

At block 550, the platform 100 may perform a data harmonization step to organize, classify, analyze and thus relate previously unrelated data stored in multiple databases and/or associated with different organizations.

At block 560, the platform 100 may perform an error correction procedure in response to an error found manually by a subject matter expert (SME) or automatically by the error detection analysis. In one embodiment, the error correction procedure may comprise tag validation and correction. Tag validation is that stamp of approval that gives confidence in the numbers and the code being generated. In another embodiment, the error correction procedure may further comprise feature engineering including adding or deleting columns, inserting values, searching or replacing values.

At block 570, the outputs of the data integration platform 100 is a master data dictionary for product category, brand or other product attributes. In some embodiments, the master data dictionary is a table storing master keyword and information of a target, such as category, brand or other product attributes, and is published and stored in the output database server 130.

It is to be understood that the above-described embodiments are merely illustrative of numerous and varied other embodiments which may constitute applications of the principles of the invention. Such other embodiments may be readily devised by those skilled in the art without departing from the spirit or scope of this invention and it is our intent they be deemed within the scope of our invention.

We claim:

1. A platform for automated data integration implemented on one or more hardware computer processors and one or more storage devices, the platform comprising:
   an input database, wherein the input database is configured to upload data from a plurality of data sources comprising a plurality of data formats;
   a data integration system, wherein the data integration system comprises a web application server, a data processing cluster, a metadata store and a message broker; and
   an output database;
   wherein the data integration system is configured to execute code in order to cause the system to:
   receive inbound message by the message broker;
   transmit data from the input database;
   pre-process data including a plurality of records, wherein the pre-processing step comprises one or more of removing empty records, removing duplicate records, removing erroneous records, and filling missing records based on an average of historical data;
   extract features from the pre-processed data by enabling a pattern recognition algorithm following a metadata-based mapping logic over the plurality of data types, wherein a metadata store is configured to store data type or feature definitions that are used to access data within the input database;
   transform the plurality of data formats to a standardized data format that is selected by a user;
   enrich the pre-processed data by enabling supervised learning to independently determine a decision boundary to separate different classes of the data by finding a linear or non-linear hyperplane or on a basis of conditional probabilities;
   align the pre-processed data by enabling supervised learning by cleansing, distance matrix, and domain understanding to unify or de-duplicate records that have similar naming convention for a given feature and standardize text;
   enhance accuracy of the pre-processed data through a user feedback loop by learning from previous prediction through the metadata-based mapping logic over the plurality of data types in the extract step and reducing errors in subsequent iterations of the user feedback loop;
   harmonize previously unrelated structured and unstructured data stored in multiple separate databases;
   generate master data of the harmonized previously unrelated structured and unstructured data of a plurality of business entities; and
   publish the master data to the output database.

2. The platform of claim 1, wherein the plurality of data sources comprise a plurality of data types.

3. The platform of claim 1, wherein data pre-processing comprises noise removal and text normalization.

4. The platform of claim 1, wherein feature extraction uses one or more algorithms selecting from a group comprising LDA2Vec, neural attention method, topic modelling, joint sentiment topic model, and Word2Vec.

5. The platform of claim 1, wherein feature extraction generates one or more keywords and informativeness of a keyword is determined by term frequency-inverse document frequency (TF-IDF).

6. The platform of claim 1, wherein a new set of business rules is created or an existing set of business rules is edited or modified based on the structured data and the unstructured data in data harmonization.

7. The platform of claim 6, wherein a business logic is defined based on the set of business rules.

8. A method for automated data integration, comprising:
uploading data to an input database from a plurality of data sources comprising a plurality of data formats;
transmitting data from the input database to a data integration system;
pre-processing data including a plurality of records, wherein the pre-processing step comprises one or more of removing empty records, removing duplicate records, and filling missing records based on an average of historical data;
transforming the plurality of data formats to a standardized data format that is selected by a user;
extracting features from the pre-processed data by enabling a pattern recognition algorithm following a metadata-based mapping framework over the plurality of data types, wherein a metadata store is configured to store data type or feature definitions that are used to access data within the input database;
enriching the pre-processed data by enabling supervised learning to independently determine a decision boundary to separate different classes of the data by finding a linear or non-linear hyperplane or on a basis of conditional probabilities;
aligning the pre-processed data by enabling supervised learning by cleansing, distance matrix, and domain understanding to unify or de-duplicate records that have similar naming convention for a given feature and standardize text;
enhancing accuracy of the pre-processed data through a user feedback loop by learning from previous prediction through the metadata-based mapping framework over the plurality of data types in the extracting step and reducing errors in subsequent iterations of the user feedback loop;
harmonizing previously unrelated structured and unstructured data stored in multiple separate databases;
generating master data of the harmonized previously unrelated structured and unstructured data of a plurality of business entities; and
publishing the master data to the output database.

9. The method of claim 8, wherein the plurality of data sources comprise a plurality of data types.

10. The method of claim 8, wherein the data pre-processing step comprises noise removal and text normalization.

11. The method of claim 8, wherein feature extraction uses one or more algorithms selecting from a group comprising LDA2Vec, neural attention method, topic modelling, joint sentiment topic model, and Word2Vec.

12. The method of claim 8, wherein feature extraction generates one or more keywords and informativeness of a keyword is determined by term frequency-inverse document frequency (TF-IDF).

13. The method of claim 8, wherein a new set of business rules is created or an existing set of business rules is edited or modified based on the structured data and the unstructured data in data harmonization.

14. The method of claim 13, wherein a business logic is defined based on the set of business rules.

\* \* \* \* \*